(12) United States Patent
Lee et al.

(10) Patent No.: US 11,096,167 B2
(45) Date of Patent: Aug. 17, 2021

(54) METHOD FOR TRANSMITTING A MAC CE IN DIFFERENT TTI DURATIONS IN WIRELESS COMMUNICATION SYSTEM AND A DEVICE THEREFOR

(71) Applicant: LG Electronics Inc., Seoul (KR)

(72) Inventors: Hanul Lee, Seoul (KR); Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 16/496,339

(22) PCT Filed: Mar. 16, 2018

(86) PCT No.: PCT/KR2018/003103
§ 371 (c)(1),
(2) Date: Sep. 20, 2019

(87) PCT Pub. No.: WO2018/174477
PCT Pub. Date: Sep. 27, 2018

(65) Prior Publication Data
US 2020/0037315 A1    Jan. 30, 2020

Related U.S. Application Data

(60) Provisional application No. 62/474,633, filed on Mar. 22, 2017.

(51) Int. Cl.
*H04W 72/04* (2009.01)
*H04L 5/00* (2006.01)
*H04W 72/14* (2009.01)

(52) U.S. Cl.
CPC ....... *H04W 72/0446* (2013.01); *H04L 5/0053* (2013.01); *H04W 72/14* (2013.01)

(58) Field of Classification Search
CPC ............ H04W 72/0446; H04W 72/14; H04W 72/1263; H04L 5/0053
See application file for complete search history.

(56) References Cited

U.S. PATENT DOCUMENTS

2016/0337909 A1* 11/2016 Cai .................. H04W 36/0033
2016/0337954 A1* 11/2016 Gulati .................. H04W 76/14
(Continued)

FOREIGN PATENT DOCUMENTS

KR    1020120079418    7/2012
KR    10-2016-0099484    8/2016

OTHER PUBLICATIONS

Ericsson, "Impacts on the UL grant and LCP of different numerologies and flexible TTI duration," R2-168659, 3GPP TSG-RAN WG2 #96, Reno, Nevada, USA, dated Nov. 14-18, 2016, 4 pages.
(Continued)

*Primary Examiner* — Ajay Cattungal
(74) *Attorney, Agent, or Firm* — Fish & Richardson P.C.

(57) ABSTRACT

The present invention relates to a wireless communication system. More specifically, the present invention relates to a method and a device for transmitting a MAC CE in different TTI durations in wireless communication system, the method comprising: receiving an indication indicating a TTI duration in which a MAC CE is allowed to be included in a MAC PDU, when one or more different TTI durations are configured to the UE; receiving UL grant with a first TTI duration, when a MAC CE is generated; generating a MAC PDU by performing a LCP procedure for the UL grant based on the indicator; and transmitting the generated MAC PDU in the first TTI duration.

14 Claims, 12 Drawing Sheets

(56) References Cited

U.S. PATENT DOCUMENTS

| | | | | |
|---|---|---|---|---|
| 2017/0325243 | A1* | 11/2017 | Yasukawa | H04W 88/04 |
| 2018/0115957 | A1* | 4/2018 | Lin | H04W 52/146 |
| 2018/0132197 | A1* | 5/2018 | Lin | H04W 52/42 |
| 2018/0176937 | A1* | 6/2018 | Chen | H04W 74/085 |
| 2018/0184436 | A1* | 6/2018 | Ohtsuji | H04B 7/2606 |
| 2018/0199390 | A1* | 7/2018 | Hahn | H04W 56/0015 |
| 2018/0249516 | A1* | 8/2018 | Jung | H04W 76/14 |
| 2018/0270698 | A1* | 9/2018 | Babaei | H04W 28/0278 |
| 2018/0270699 | A1* | 9/2018 | Babaei | H04W 72/1284 |
| 2018/0270700 | A1* | 9/2018 | Babaei | H04W 72/1284 |
| 2019/0116582 | A1* | 4/2019 | Pelletier | H04W 72/10 |
| 2019/0149274 | A1* | 5/2019 | Freda | H04W 72/0453 |
| | | | | 370/329 |

OTHER PUBLICATIONS

Extended European Search Report in European Application No. 18772267.3, dated Nov. 24, 2020, 6 pages.

LG Electronics Inc., "LCP restriction for MAC CE," R2-1708754, 3GPP TSG-RAN2 Meeting #99, Berlin, Germany, dated Aug. 21-25, 2017, 2 pages.

Ericsson, "Logical Channel Prioritization with short TTI", R2-1701609, 3GPP TSG-RAN WG2 #97, Athens, Greece, Feb. 13-17, 2017, 3 pages.

Huawei, HiSilicon, "Multiplexing and LCP procedure of Different TTIs", R2-1701884, 3GPP TSG-RAN WG2 Meeting #97, Athens, Greece, Feb. 13-17, 2017, 4 pages.

LG Electronics Inc., "Clarification on DPR MAC CE", R2-1701455, 3GPP TSG-RAN WG2 #97, Athens, Greece, Feb. 13-Feb. 17, 2017, 4 pages.

PCT International Search Report and Written Opinion in International Application No. PCT/KR2018/003103, dated Jul. 2, 2018, 10 pages.

Samsung, "Discussion on Activation/Deactivation CSI-RS MAC CE for eFD-MIMO", R2-1701829, 3GPP TSG-RAN WG2 Meeting #97, Athens, Greece, Feb. 13-17, 2017, 6 pages.

KR Notice of Allowance in Korean Appln. No. 10-2019-7029396, dated Apr. 30, 2021, 3 pages (with English translation).

* cited by examiner (a) Control-Plane Protocol Stack (b) User-Plane Protocol Stack (a) Control-Plane Protocol Stack (b) User-Plane Protocol Stack

METHOD FOR TRANSMITTING A MAC CE IN DIFFERENT TTI DURATIONS IN WIRELESS COMMUNICATION SYSTEM AND A DEVICE THEREFOR

CROSS-REFERENCE TO RELATED APPLICATIONS

This application is a National Stage application under 35 U.S.C. § 371 of International Application No. PCT/KR2018/003103, filed on Mar. 16, 2018, which claims the benefit of U.S. Provisional Application No. 62/474,633, filed on Mar. 22, 2017. The disclosures of the prior applications are incorporated by reference in their entirety.

TECHNICAL FIELD

The present invention relates to a wireless communication system and, more particularly, to a method for transmitting a MAC CE in different TTI durations in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for transmitting a MAC CE in different TTI durations in wireless communication system.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In this invention, when the UE constructs a MAC PDU, the UE includes MAC CEs only when the TTI duration of the UL grant is allowed to include MAC CE in order to ensure the reliability of the MAC CE transmissions.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 is an example for L2 data flow between a UE and a NG-RAN;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
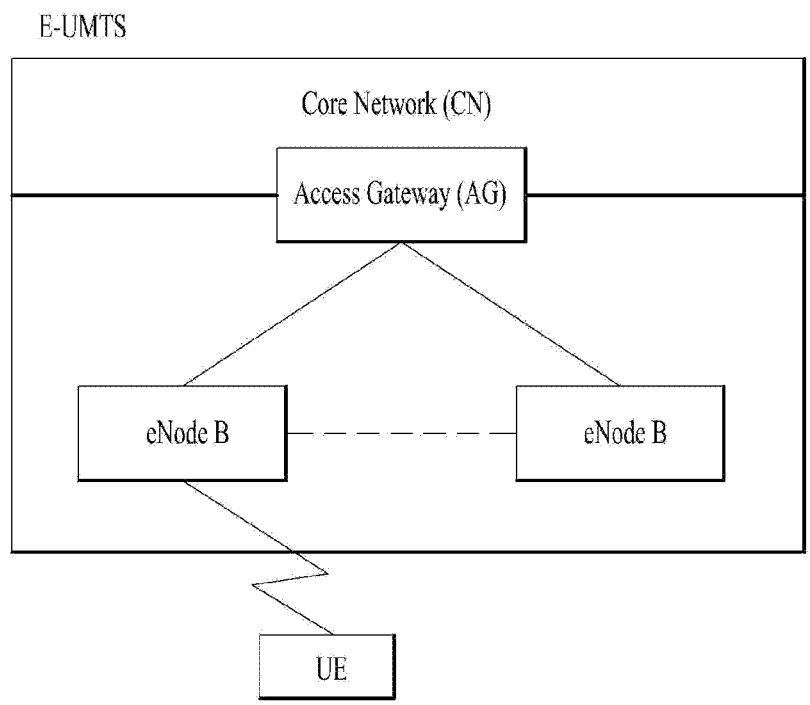
FIG. 1 is a diagram showing a network structure of an Evolved Universal Mobile Telecommunications System (E-UMTS) as an example of a wireless communication system.
Figure 2A:
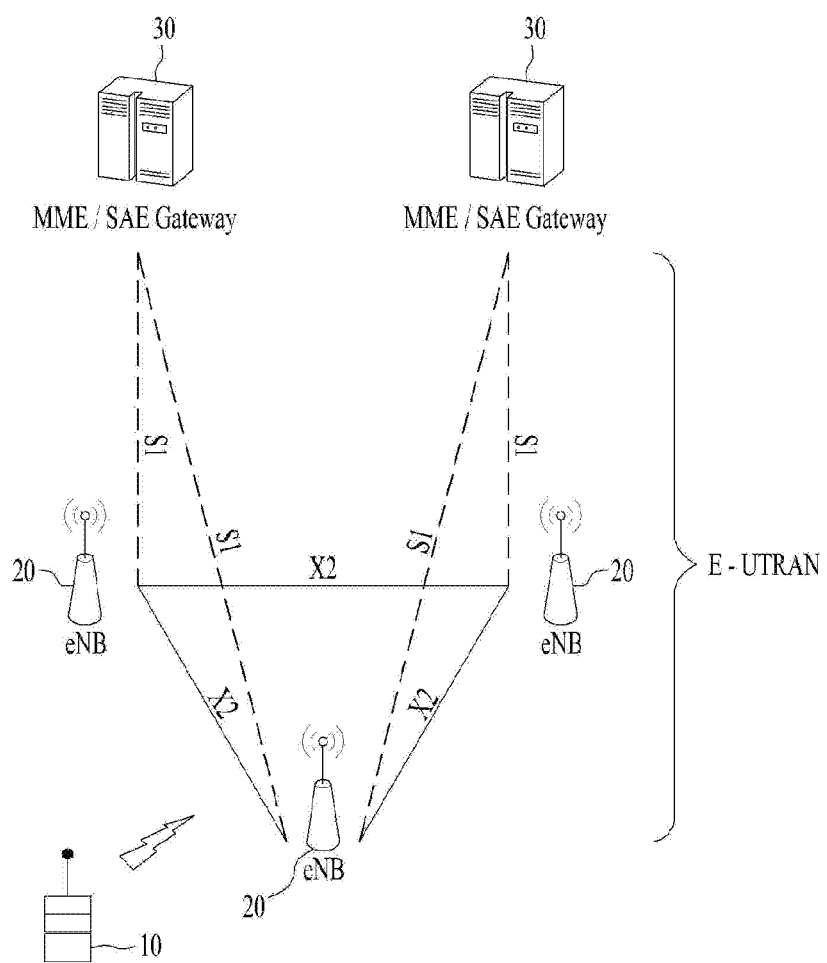
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
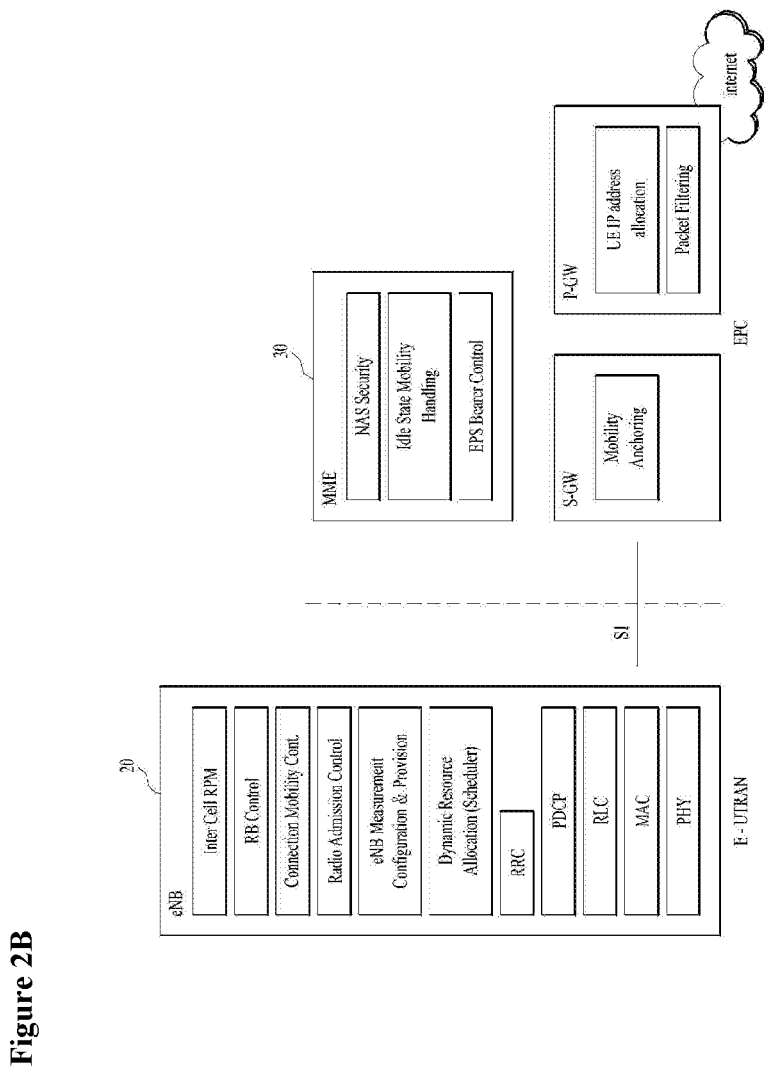
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
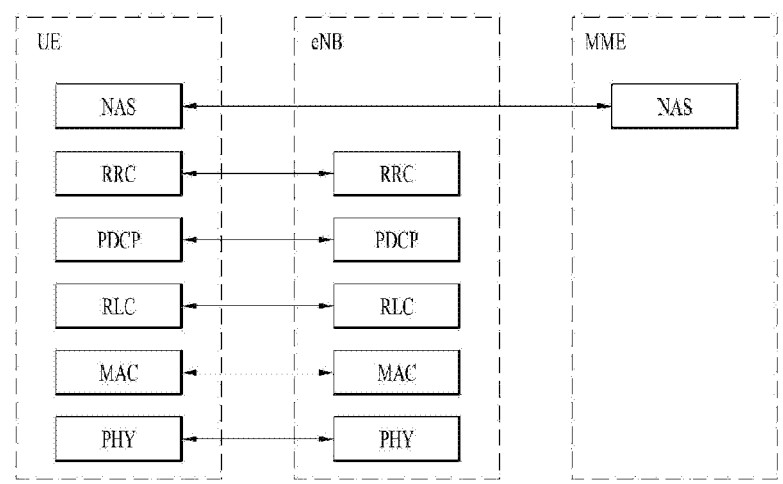
FIG. 3 is a diagram showing a control plane and a user plane of a radio interface protocol between a UE and an E-UTRAN based on a 3rd generation partnership project (3GPP) radio access network standard.
Figure 3:
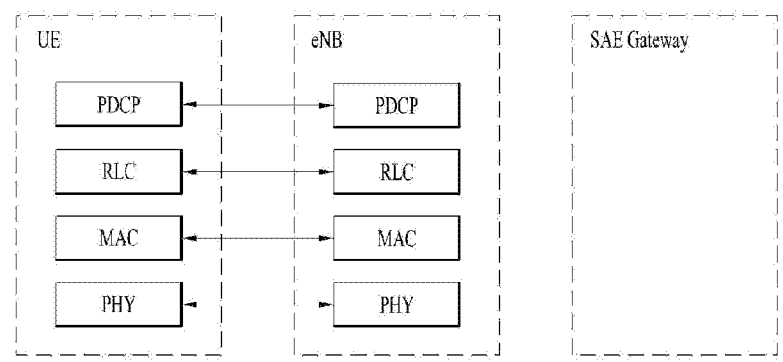

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
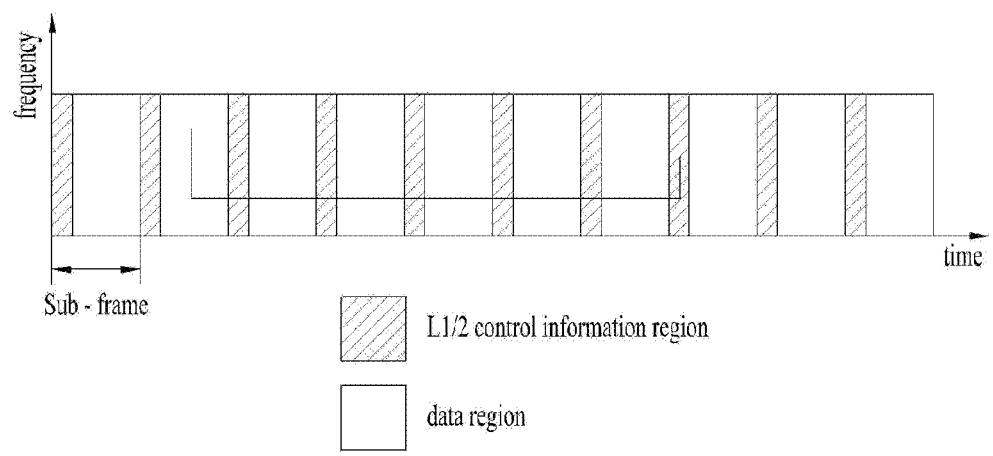
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5A:
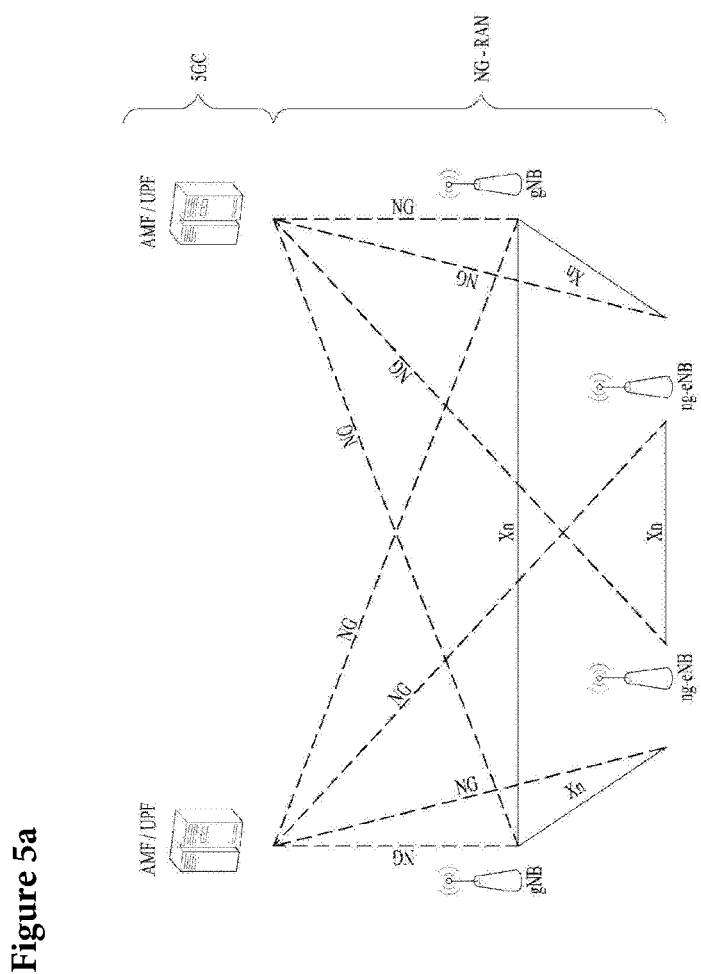
FIG. 5A is a block diagram illustrating network structure of NG Radio Access Network (NG-RAN) architecture.
Figure 5B:
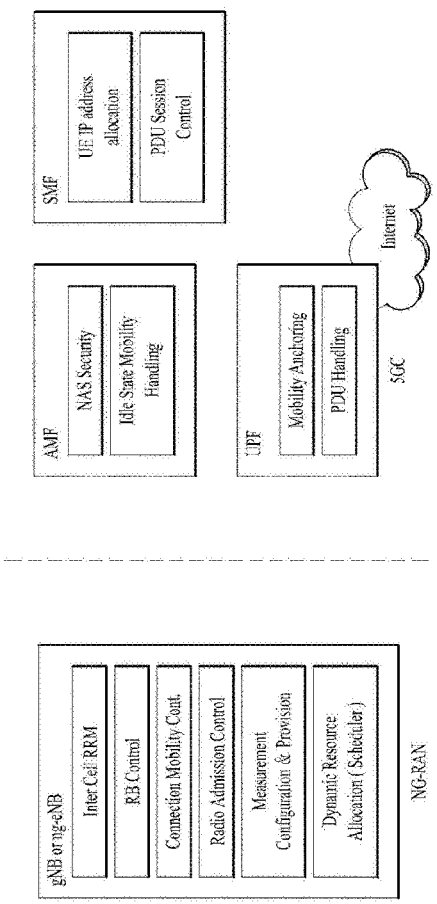
FIG. 5B is a block diagram depicting architecture of functional Split between NG-RAN and 5G Core Network (5GC)

FIG. 5A is a block diagram illustrating network structure of NG Radio Access Network (NG-RAN) architecture, and FIG. 5B is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 6:
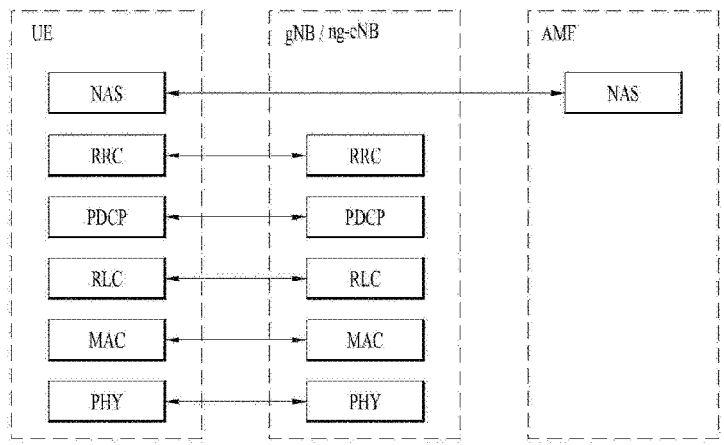
FIG. 6 is a diagram showing a control plane and a user plane of a radio interface protocol between a UE and a NG-RAN based on a 3rd generation partnership project (3GPP) radio access network standard.
Figure 6:
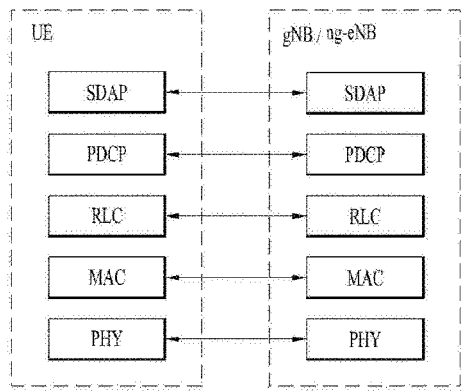

FIG. 6 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 7:
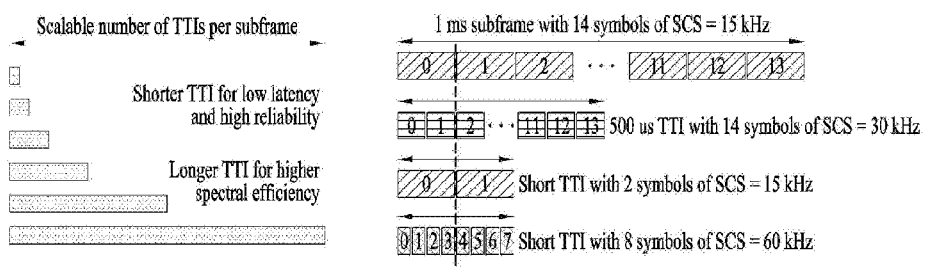
FIG. 7 is an example of a Scalable Transmission Time Interval structure used in an NG-RAN.

FIG. 7 is an example of a Scalable Transmission Time Interval structure used in an NG-RAN.

In the time domain, 5G NR will enable scalability to latencies much lower than what's possible in today's LTE networks. Today, LTE supports a fixed TTI of 1 ms. In the LTE evolution path, there is an ongoing Work Item on latency reduction in 3GPP. Though the technical details are still under discussion, the design target for one-time transmission latency is 8 shortened TTI (sTTI, 1.14 ms) with 143 µs sTTI. To better support service with long latency requirement, the 5G NR flexible frame structure is being designed with TTI that will scale up and down, depending on specific service requirements. This flexibility allows the air interface to optimize for lower latencies using shorter TTI (e.g., 100s of µs) or trading off for higher spectral efficiency for delay-tolerant use cases with a longer TTI.

In addition to a scalable TTI, 5G NR will also support service-aware TTI multiplexing on the same frequency that allows transmissions with different TTIs to start on integer symbol boundaries instead of a subframe boundary (i.e., 1 ms). For instance, a high-QoS mobile broadband service may choose to utilize a 500 µs TTI instead of a standard, LTE-compatible 1 ms TTI/subframe, while another latency sensitive service further shortens its TTI to just 2 symbols (e.g., ~140 µs). Instead of requiring the second, latency-sensitive transmission to wait until the beginning of the next subframe (i.e., 500 µs later), it can begin as soon as the previous transmission is completed, on the symbol boundary, thereby eliminating a waiting period. As shown on the right hand side of FIG. 7, symbols across different 5G NR numerologies are designed to align at the symbol boundaries, which is critical for this efficient multiplexing of long and short TTIs.

Figure 8:
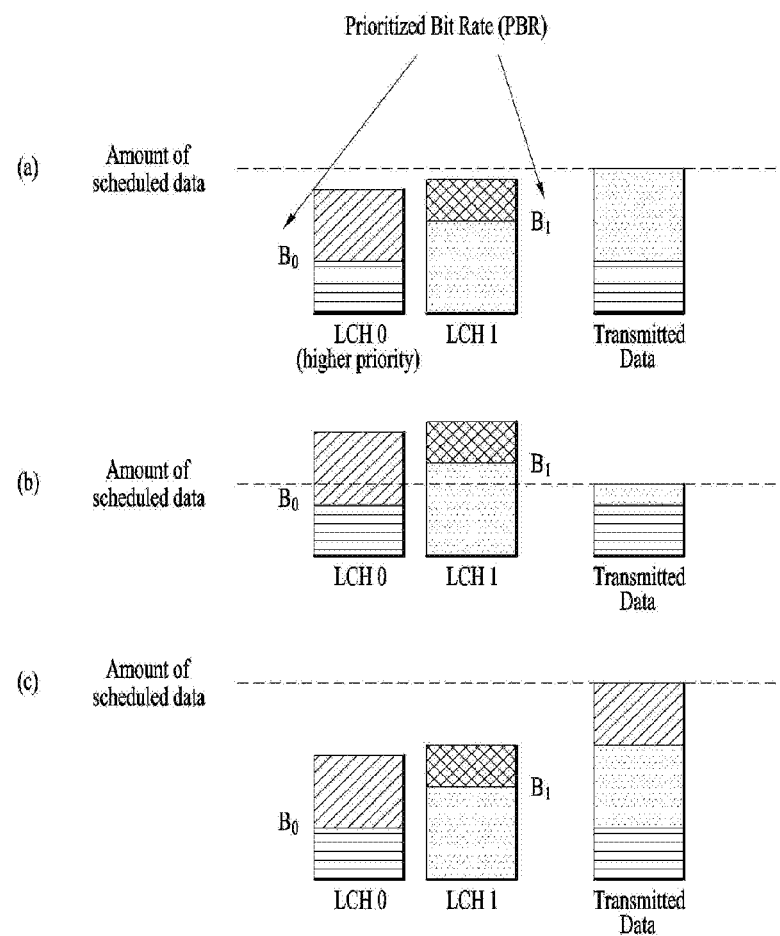
FIG. 8 is an example for performing a Logical Channel Prioritization procedure when a new transmission is performed.

FIG. 8 is an example for performing a Logical Channel Prioritization procedure when a new transmission is performed.

Multiple logical channels of different priorities can be multiplexed into the same transport block using the same MAC multiplexing functionality as in the downlink. However, unlike the downlink case, where the prioritization is under control of the scheduler and up to the implementation, the uplink multiplexing is done according to a set of well-defined rules in the terminal as a scheduling grant applies to a specific uplink carrier of a terminal, not to a specific radio bearer within the terminal. Using radio-bearer-specific scheduling grants would increase the control signaling overhead in the downlink and hence per-terminal scheduling is used in LTE.

The simplest multiplexing rule would be to serve logical channels in strict priority order. However, this may result in starvation of lower-priority channels; all resources would be given to the high-priority channel until its transmission buffer is empty. Typically, an operator would instead like to provide at least some throughput for low-priority services as well. Therefore, for each logical channel in an LTE terminal, a prioritized data rate is configured in addition to the priority value. The logical channels are then served in decreasing priority order up to their prioritized data rate (Prioritized Bit Rate, PRB), which avoids starvation as long as the scheduled data rate is at least as large as the sum of the prioritized data rates. Beyond the prioritized bit rates, channels are served in strict priority order until the grant is fully exploited or the buffer is empty. This is a Logical Channel Prioritization (LCP) procedure, as illustrated in FIG. 7.

The LCP procedure is used for MAC PDU construction by deciding the amount of data from each logical channel and the type of MAC Control Element that should be included in the MAC PDU. Constructing a MAC PDU with PBR consists of two rounds. In the first round, each logical channel is served in decreasing order of logical channel priority, but the amount of data from each logical channel included in the MAC PDU is initially limited to the amount corresponding to the configured PBR value of the logical channel. After all logical channels have been served up to their PBR values, if there is room left in the MAC PDU, the second round is performed. In the second round, each logical channel is served again in decreasing order of priority. The major difference for the second round compared to the first round is that each logical channel of lower priority can be allocated with MAC PDU space only if all logical channels of higher priority have no more data to transmit.

Priority of MAC CEs and data from logical channels (Highest to Lowest):

MAC CE for C-RNTI or data from UL-CCCH;

MAC CE for BSR, with the exception of BSR included for padding;

MAC CE for PHR;

Data from any logical channel, except data from UL-CCCH;

MAC CE for padding BSR.

Rather than applying the above PBR requirements for every subframe, it is better to meet the PBR requirements for a long time period. To reduce the overhead and to prevent too much segmentation, the token bucket model with PBR is applied. In the token-bucket model, each logical channel is associated with two parameters: bucketSizeDuration and prioritizedBitRate.

In this model, it is assumed that each logical channel is given a right to transmit a prioritizedBitRate amount of data in every subframe. If a certain logical channel has not fully used the right to transmit its prioritizedBitRate amount of data in a certain subframe, the remaining right can be used in another subframe. The right to transmit can be accumulated up to a (prioritizedBitRate×bucketSizeDuration) amount of data. When some data for the logical channel are included in a MAC PDU, the right to transmit is decreased by the amount of data included in the MAC PDU. To prevent a certain logical channel from accumulating too much right to transmit, the parameter bucketSizeDuration sets the limit up to which a logical channel can accumulate the right to transmit. Through this token-bucket model, the UE can meet the PBR principle on average for a longer time period, not per subframe.

As shown FIGS. 8a to 8c, it is assumed that a priority of the LCH 0 is higher than a priority of the LCH 1, and PBR of LCH0 is $B_0$, and PBR of LCH1 is $B_1$.

In case of FIG. 8a, if the amount of scheduled data is enough to include an amount of blue of LCH 1, the UE can transmit data including red of LCH 0 and blue of LCH 1 as much as the amount of scheduled data.

In case of FIG. 8b, if the amount of scheduled data is not enough to include an amount of blue of LCH 1, the UE may first generate data including the red of LCH0 and may only include the data including the blue of LCH1 up to the amount of scheduled data.

In case of FIG. 8c, if UL grants are sufficient after generating data by including red of LCH 0 and blue of LCH 1, the UE can includes data of the hatched portion of LCH0 as much as the remaining grants since the priority of the LCH 0 is higher than a priority of the LCH 1.

Meanwhile, in prior art, the TTI duration is basically 1 ms and MAC Control Elements (CE) are always included in MAC PDU regardless of TTI duration. If the UE is configured with different TTI durations (e.g. shorted TTI<1 ms), there is still no consideration for MAC CE handling, even though the LCP procedure is performed for logical channels with the same TTI duration and a MAC PDU is constructed by data from logical channels with the same TTI duration.

With introduction of different TTI duration, when the MAC PDU is generated, if the MAC CE is always included in MAC PDU, which may cause a reliability problem to transmit the MAC CE. Because if a TTI duration is shortened, it may be less reliable than the legacy TTI duration. In this case, the reliability can be ensured by indicating a reliable TTI duration for MAC CE transmission. Also, if we want to transmit MAC CE quickly, we can achieve it to use shortened TTI duration.

Figure 9:
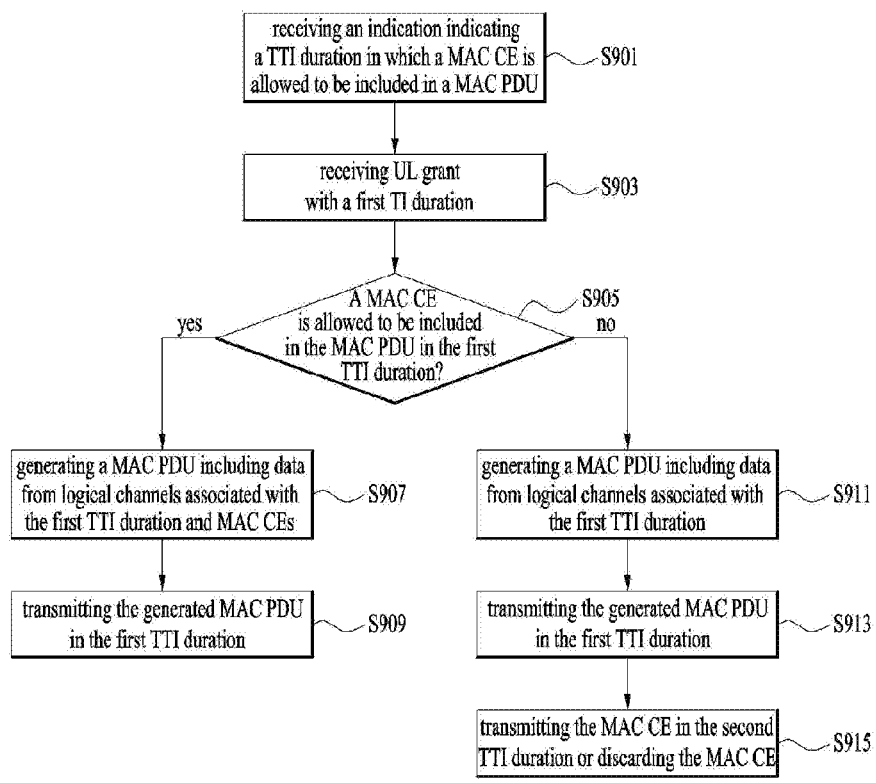
FIG. 9 is a conceptual diagram for transmitting a MAC CE in different TTI durations in wireless communication system according to embodiments of the present invention.

FIG. 9 is a conceptual diagram for transmitting a MAC CE in different TTI durations in wireless communication system according to embodiments of the present invention.

In this invention, it is proposed that the UE generates a MAC PDU considering different TTI duration. And it is proposed when UE constructs a MAC PDU, the UE includes MAC CEs only when the indication of the UL grant is allowed to include MAC CE.

It is assume that the eNB supports different TTI duration and the UE also supports different TTI duration.

When the UE receives an indication indicating a TTI duration in which a MAC CE is allowed to be included in a MAC PDU (S901) and the UL grant with a first TTI duration (S903), the UE checks whether a MAC CE is allowed to be included in the MAC PDU in the first TTI duration (S905).

Preferably, the UL grant may be received when a MAC CE is generated, and the indicator may be received together with the UL grant.

The indicator indicates that an allowed TTI duration to include MAC CE when generating a MAC PDU of a corresponding TTI duration, or a not allowed TTI duration to include MAC CE when generating a MAC PDU of a corresponding TTI duration.

Or the indicator indicates whether a MAC CE is allowed to be included in MAC PDU or not in a corresponding TTI duration. In this case, the indicator is received with every UL grant.

Preferably, the indicator may be received via RRC signaling, or MAC signaling.

If the indicator indicates that a MAC CE is allowed to be included in the MAC PDU in the first TTI duration, the UE generates the MAC PDU by performing a LCP procedure for the UL grant, and the MAC PDU includes data from logical channels associated with the first TTI duration and MAC CEs (S907).

And the UE transmits the generated MAC PDU in the first TTI duration (S909).

Otherwise, if the indicator indicates that a MAC CE is not allowed to be included in the MAC PDU in the first TTI duration, the UE generates the MAC PDU by performing a LCP procedure for the UL grant, and the MAC PDU includes only data from logical channels associated with the first TTI duration (S911). And the UE transmits the generated MAC PDU in the first TTI duration (S913). In this case, the MAC CE is transmitted a second TTI duration in which a MAC CE is allowed to be included in a MAC PDU or the MAC CE is discarded (S915).

Figure 10:
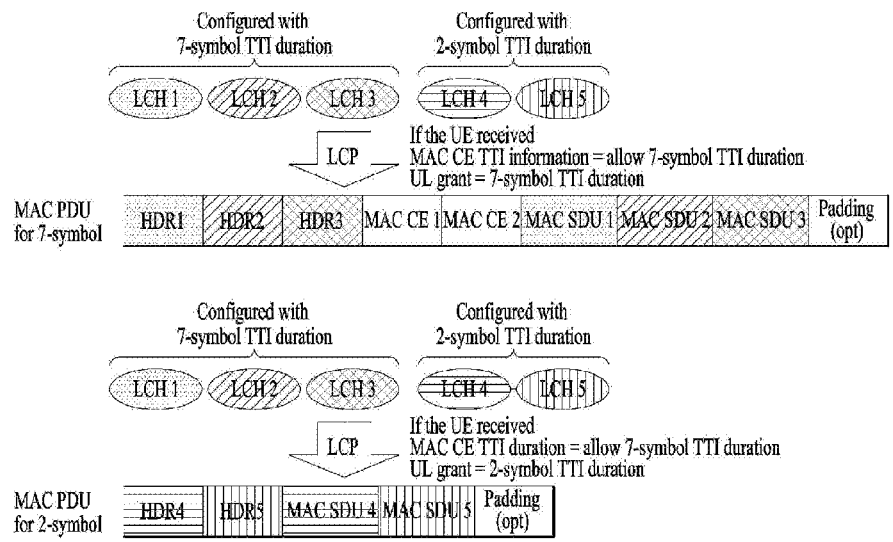
FIGS. 10 and 11 are examples for transmitting a MAC CE in different TTI durations in wireless communication system according to embodiments of the present invention.

FIG. 10 is an example for transmitting a MAC CE in different TTI durations in wireless communication system according to embodiments of the present invention.

It is assumed that the eNB supports different TTI duration and the UE also supports different TTI duration, and Logical channels 1, 2 and 3 are configured with 7-symbol TTI duration and logical channels 4 and 5 are configured with 2-symbol TTI duration.

The UE receives the MAC CE TTI information indicates that only 7-symbol TTI duration is allowed to include MAC CE in MAC PDU.

Preferably, the MAC CE TTI information is received as well as a UL grant with TTI duration.

When the UE receives MAC CE TTI information, the UE checks that an allowed TTI duration indicated by the MAC CE TTI information is to include MAC CE in MAC PDU when generating a MAC PDU of the corresponding TTI duration.

If the TTI duration received with the UL grant is equal to the TTI duration indicated in the MAC CE TTI information, the UE performs LCP procedure considering data from logical channels that support the TTI duration and MAC CEs, i.e. MAC CEs are considered in LCP procedure and can be included in MAC PDU.

If the TTI duration received with the UL grant is not equal to the TTI duration indicated in the MAC CE TTI information, the UE performs LCP procedure considering only data from logical channels that support the TTI duration, i.e. MAC CEs are not considered in LCP procedure and cannot be included in MAC PDU.

For example, when the UE receives UL grant with 7-symbol TTI duration, the UE performs LCP procedure and constructs MAC PDU including data from logical channels 1, 2 and 3 and MAC CEs. The UE then transmits the MAC PDU to the eNB/gNB using the received UL grant.

When the UE receives UL grant with 2-symbol TTI duration, the UE performs LCP procedure and constructs MAC PDU only including data from logical channels 4 and 5 without any MAC CEs even if there is one or more triggered MAC CEs. The UE then transmits the MAC PDU to the eNB/gNB using the received UL grant.

Otherwise, the MAC CE TTI information indicates that 2-symbol TTI duration is NOT allowed to include MAC CE in MAC PDU.

In this case, if the TTI duration received with the UL grant is not equal to the TTI duration indicated in the MAC CE TTI information, the UE performs LCP procedure and constructs MAC PDU including data from logical channels 1, 2 and 3 and MAC CEs. The UE then transmits the MAC PDU to the eNB/gNB using the received UL grant.

If the TTI duration received with the UL grant is equal to the TTI duration indicated in the MAC CE TTI information, the UE performs LCP procedure and constructs MAC PDU only including data from logical channels 4 and 5 without any MAC CEs even if there is one or more triggered MAC CEs. The UE then transmits the MAC PDU to the eNB/gNB using the received UL grant. After constructing a MAC PDU, the UE transmits the MAC PDU using the received UL grant to the eNB/gNB.

Preferably, the MAC CE TTI information may include one or more TTI duration which can or cannot include a MAC CE.

Figure 11:
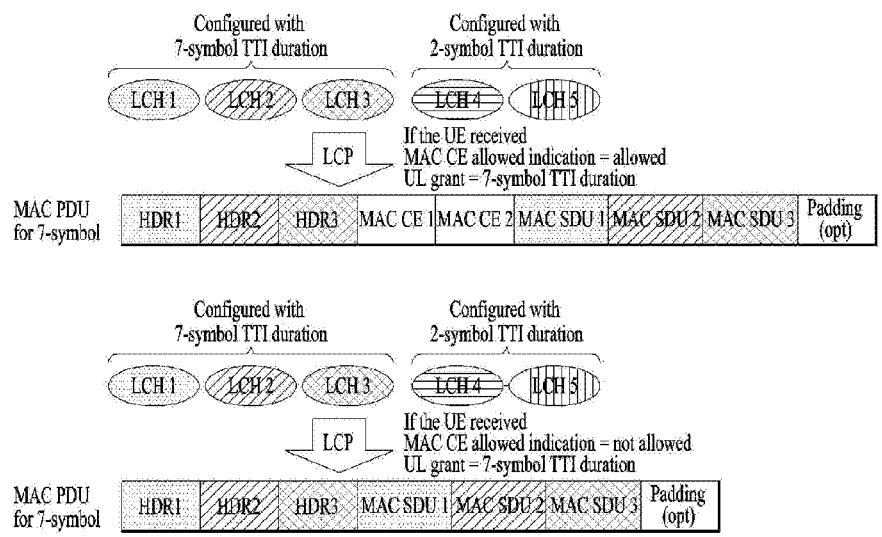

FIG. 11 is an example for transmitting a MAC CE in different TTI durations in wireless communication system according to embodiments of the present invention.

If the eNB supports different TTI duration and the UE also supports different TTI duration, the eNB can transmit a MAC CE allowed indication with UL grant and a TTI duration with UL grant. The MAC CE allowed indication transmitted with UL grant indicates whether the MAC CE is allowed to be included in MAC PDU or not when generating a MAC PDU of the corresponding TTI duration.

In this case, the MAC CE allowed indication can be received with every UL grant, and TTI duration received with UL grant.

If the MAC CE allowed indication allows to include MAC CE, the UE performs LCP procedure considering data from logical channels that support the TTI duration and MAC CEs, i.e. MAC CEs are considered in LCP procedure and can be included in MAC PDU.

And if the MAC CE allowed indication does not allow to include MAC CE, the UE performs LCP procedure considering only data from logical channels that support the TTI duration, i.e. MAC CEs are not considered in LCP procedure and cannot be included in MAC PDU.

For example, it is assumed that Logical channels 1, 2 and 3 are configured with 7-symbol TTI duration and logical channels 4 and 5 are configured with 2-symbol TTI duration.

The UE receives received a UL grant with 7-symbol TTI duration and MAC CE allowed indication indicating MAC CE is allowed, the UE performs LCP procedure and constructs MAC PDU including data from logical channels 1, 2 and 3 and MAC CEs. The UE then transmits the MAC PDU to the eNB/gNB using the received UL grant.

If the MAC CE allowed indication indicates that MAC CE is not allowed, the UE performs LCP procedure and constructs MAC PDU only including data from logical channels 1, 2 and 3 without any MAC CEs even if there is one or more triggered MAC CEs. The UE then transmits the MAC PDU to the eNB/gNB using the received UL grant.

Figure 12:
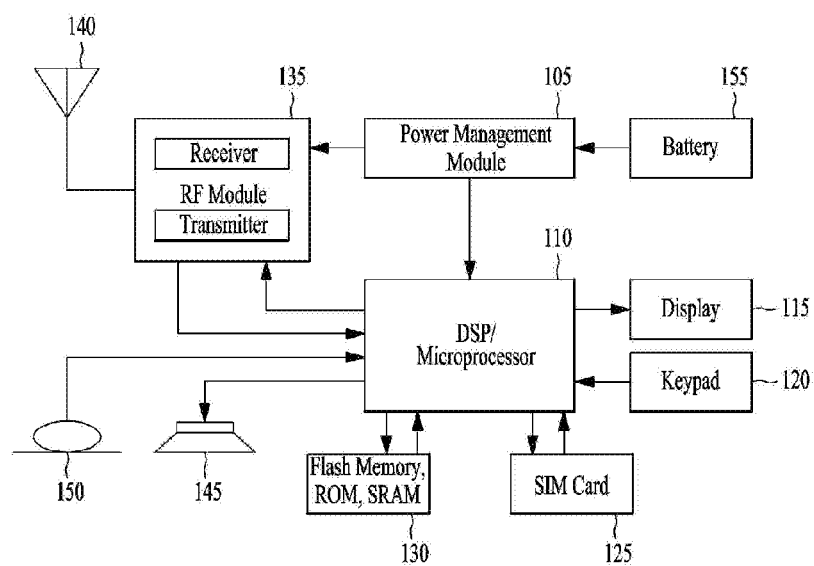
FIG. 12 is a block diagram of a communication apparatus according to an embodiment of the present invention.

FIG. 12 is a block diagram of a communication apparatus according to an embodiment of the present invention.

The apparatus shown in FIG. 12 can be a user equipment (UE) and/or eNB adapted to perform the above mechanism, but it can be any apparatus for performing the same operation.

As shown in FIG. 12, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 12 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 12 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
   receiving an indication indicating a Transmission Time Interval (TTI) duration in which a Medium Access Control (MAC) Control Element (CE) is allowed to be included in a MAC Protocol Data Unit (PDU), when one or more different TTI durations are configured to the UE;
   receiving uplink (UL) grant with a first TTI duration, when a MAC CE is generated;
   generating a MAC PDU by performing a Logical Channel Prioritization (LCP) procedure for the UL grant based on the indicator;
   transmitting the generated MAC PDU in the first TTI duration,
   wherein if the indicator indicates that a MAC CE is allowed to be included in the MAC PDU in the first TTI duration, the MAC PDU includes data from logical channels associated with the first TTI duration and MAC CEs, and
   wherein if the indicator indicates that a MAC CE is not allowed to be included in the MAC PDU in the first TTI duration, the MAC PDU includes only data from logical channels associated with the first TTI duration.

2. The method according to claim 1, wherein when the MAC PDU includes only data from logical channels associated with the first TTI duration, the MAC CE is transmitted a second TTI duration in which a MAC CE is allowed to be included in a MAC PDU.

3. The method according to claim 1, wherein when the MAC PDU includes only data from logical channels associated with the first TTI duration, the MAC CE is discarded.

4. The method according to claim 1, wherein the indicator is received together with the UL grant.

5. The method according to claim 1, wherein the indicator is received via Radio Resource Control (RRC) signaling, or MAC signaling.

6. The method according to claim 1, wherein the indicator indicates:

an allowed TTI duration to include MAC CE when generating a MAC PDU of a corresponding TTI duration; or a not allowed TTI duration to include MAC CE when generating a MAC PDU of a corresponding TTI duration.

7. The method according to claim 1, wherein when the indicator is received with every UL grant, the indicator indicates whether a MAC CE is allowed to be included in MAC PDU or not in a corresponding TTI duration.

8. A User Equipment (UE) for operating in a wireless communication system, the UE comprising:
a Radio Frequency (RF) module; and
a processor operably coupled with the RF module and configured to:
receive an indication indicating a Transmission Time Interval (TTI) duration in which a Medium Access Control (MAC) Control Element (CE) is allowed to be included in a MAC Protocol Data Unit (PDU), when one or more different TTI durations are configured to the UE;
receive uplink (UL) grant with a first TTI duration, when a MAC CE is generated;
generate a MAC PDU by performing a Logical Channel Prioritization (LCP) procedure for the UL grant based on the indicator;
transmit the generated MAC PDU in the first TTI duration,
wherein if the indicator indicates that a MAC CE is allowed to be included in the MAC PDU in the first TTI duration, the MAC PDU includes data from logical channels associated with the first TTI duration and MAC CEs, and wherein if the indicator indicates that a MAC CE is not allowed to be included in the MAC PDU in the first TTI duration, the MAC PDU includes only data from logical channels associated with the first TTI duration.

9. The UE according to claim 8, wherein when the MAC PDU includes only data from logical channels associated with the first TTI duration, the MAC CE is transmitted a second TTI duration in which a MAC CE is allowed to be included in a MAC PDU.

10. The UE according to claim 8, wherein when the MAC PDU includes only data from logical channels associated with the first TTI duration, the MAC CE is discarded.

11. The UE according to claim 8, wherein the indicator is received together with the UL grant.

12. The UE according to claim 8, wherein the indicator is received via Radio Resource Control (RRC) signaling, or MAC signaling.

13. The UE according to claim 8, wherein the indicator indicates:
an allowed TTI duration to include MAC CE when generating a MAC PDU of a corresponding TTI duration; or a not allowed TTI duration to include MAC CE when generating a MAC PDU of a corresponding TTI duration.

14. The UE according to claim 8, wherein when the indicator is received with every UL grant, the indicator indicates whether a MAC CE is allowed to be included in MAC PDU or not in a corresponding TTI duration.

* * * * *